US006136883A

United States Patent [19]
Yang et al.

[11] Patent Number: 6,136,883
[45] Date of Patent: Oct. 24, 2000

[54] RESIN FOR AN ORIENTED-REINFORCEMENT PREPREG THAT CAN BE SHAPED AND MOLDED PRODUCTS THAT ARE OBTAINED

[75] Inventors: Yeong-Show Yang, Witney, United Kingdom; Francette Porato, Le Mesnil en Thelle; Serge Lequeux, Verneuil en Halatte, both of France

[73] Assignee: Cray Valley S.A., France

[21] Appl. No.: 08/598,171

[22] Filed: Feb. 7, 1996

[30] Foreign Application Priority Data

Feb. 7, 1995 [FR] France ................................ 95 01485

[51] Int. Cl.[7] .............................. C08L 75/06; C08F 2/46; C08G 18/62; C08G 18/42
[52] U.S. Cl. ...................... 522/174; 427/220; 427/372.2; 427/385.5; 427/389.7; 427/389.9; 427/393.5; 428/368; 428/375; 428/394; 428/395; 428/396; 442/59; 442/63; 442/103; 522/60; 522/90; 522/93; 522/173
[58] Field of Search ................................ 522/90, 60, 93, 522/173, 174; 525/123, 126, 131, 440; 528/49, 50, 75, 80, 83; 428/245, 260, 261, 265, 267, 268, 272, 273, 368, 375, 394, 395, 396; 427/220, 372.2, 385.5, 389.7, 389.9, 393.5; 442/59, 63, 103

[56] References Cited

U.S. PATENT DOCUMENTS

| | | | |
|---|---|---|---|
| 3,886,229 | 5/1975 | Hutchinson et al. | 528/66 |
| 4,107,101 | 8/1978 | Kubens | 521/137 |
| 4,172,060 | 10/1979 | Dalibor et al. | 528/75 |
| 4,233,396 | 11/1980 | Armstrong et al. | 430/320 |
| 4,366,301 | 12/1982 | LeRoy et al. | 528/66 |
| 4,532,097 | 7/1985 | Daniels et al. | 264/258 |
| 4,773,952 | 9/1988 | Wesley, Jr. | 156/191 |
| 4,801,495 | 1/1989 | Van der Hoeven | 428/286 |
| 4,880,872 | 11/1989 | Thomas | 525/43 |
| 5,088,735 | 2/1992 | Shigetoh | 428/257 |
| 5,159,044 | 10/1992 | Bogner | 528/75 |

FOREIGN PATENT DOCUMENTS

| | | |
|---|---|---|
| 007 778 | 2/1980 | European Pat. Off. . |
| 391 668 | 10/1990 | European Pat. Off. . |
| 1162724 | 8/1969 | United Kingdom . |

OTHER PUBLICATIONS

Derwent Abstract of JP 57 078 424. May 1982.
Derwent Abstract of JP 5,001,157 Jan. 1993.
Derwent Abstract of JP 2,218,196. Aug. 1990.
Derwent Abstract of JP 5117347. May 1993.
Japio Abstract of JP 5117347. May 1993.

*Primary Examiner*—Rabon Sergent
*Attorney, Agent, or Firm*—Millen, White, Zelano & Branigan, P.C.

[57] ABSTRACT

A modified polyester-polyurethane resin is formed by reacting at least one polyisocyanate at least one polyol polyester that is prepared from at least one diacid or ethylenically unsaturated anhydride and at least one polyhydric alcohol, at least one ethylenically unsaturated monomer, at least one promoter of the decomposition of the catalyst peroxide, at least one catalyst of the isocyanate-alcohol reaction, and at least one hydroxylated (alk)acrylate and is used for the impregnation of oriented reinforcements. The resin makes possible quick molding, at moderate temperature, of parts with high mechanical properties.

14 Claims, No Drawings

RESIN FOR AN ORIENTED-REINFORCEMENT PREPREG THAT CAN BE SHAPED AND MOLDED PRODUCTS THAT ARE OBTAINED

This application is related to application Ser. No. 08/598,170, now U.S. Pat. No. 5,851,667 which is incorporated by reference in its entirety herein.

BACKGROUND OF THE INVENTION

This invention relates to a resin that is intended particularly for the fabrication of oriented-reinforcement prepregs that is suitable for shaping with oriented-reinforcement materials and to their applications in the areas of leisure activities; shipbuilding, aviation, and automotive design; and the electrical and electronics industries.

Prepregs made of unsaturated polyester resin in the form of relatively rigid sheets with a thickness of up to about 1 cm, particularly for the production of large-dimension parts with good mechanical resistance, are already known. They are obtained by impregnating long glass fibers (i.e., of a length at least equal to about 25 mm) by a paste of low viscosity that comprises unsaturated polyester resin, a free-radical catalyst, a shrinkage-compensating agent, a curing agent (such as magnesia), a demolding agent, an ethylenically unsaturated monomer, a mineral filler, and, if necessary, a pigment paste, then by allowing the viscosity to increase during a so-called curing phase.

Furthermore, various polyester-polyurethane hybrid resins are known, particularly from patents U.S. Pat. No. 4,107,101; U.S. Pat. No. 4,280,979; U.S. Pat. No. 4,880,872; FR-A-2 667 602 and WO 94/00503.

For the needs of various applications in the areas of leisure activities; shipbuilding, aviation, and automotive design; and the electrical and electronics industries (particularly for printed circuits), attempts are now being made to find oriented-reinforcement prepregs that simultaneously have a set of favorable properties such as:

good wetting of the oriented reinforcement (such as glass, carbon or organic fiber, cloth or mat) by the synthetic resin, manipulability of the prepreg (i.e., sufficient rigidity and absence of sticking) after as short a time as possible, stability of the prepreg (i.e., moldability), after storage at a temperature of about −18° C. to 30° C., for as long a period as possible, as low a molding temperature and as short a molding time as possible, good adhesion of the prepreg to materials as varied as metals (in particular copper, steel and aluminum), thermoplastic polymers (such as particularly polyethylene, polypropylene, polyamides), and polyurethanes (in the form of, for example, foam), mechanical properties (particularly tensile strength, flexural strength, compression strength and impact resistance, elastic limit) that are as high as possible both at room temperature (up to about 40° C.) and under cold conditions (to about−40° C.).

As far as the synthetic resin that impregnates the oriented reinforcement is concerned, these different requirements are expressed by the need for a pot service life ("pot life") at room temperature (23° C.), or stability before use, of at least about 30 minutes and preferably at least about 45 minutes to carry out the impregnation of the oriented reinforcement.

In addition, in the fabrication of certain high-performance products that are intended for areas of leisure activities; of shipbuilding, aviation, and automotive design; and of the electrical and electronics industries, whereby the high performance levels of these products are attained by juxtaposing several (at times up to 5) materials of different types, including an oriented-reinforcement material that is preimpregnated with resin, a process of production that consists in assembling the various materials—with the exception of the resin—in a mold, then injecting the resin into the mold while molding the product by raising the temperature of the mold until the resin hardens enough to connect the oriented reinforcements and to ensure the adhesion of the oriented-reinforcement material to the other constituent materials of the product are known. This process makes it possible to guarantee the high performance levels of the products thus obtained, particularly high mechanical properties at room temperature and under cold conditions. It has the drawback, however, of requiring a relatively long molding time, for example, on the order of 20 minutes around 100° C. (case of the electronics industry) or else a cycle of several hours for increasing the molding temperature from 120° to 180° C. (case of the automotive industry). This drawback interferes with the productivity of the manufacture of these products and consequently accounts for their high costs. For the needs of high-performance products intended for the areas of leisure activities; shipbuilding, aviation, and automotive design; and the electrical and electronics industries, whereby the high performance levels of these products are attained by juxtaposing several (at times up to 5) materials of different natures, including a preimpregnated oriented-reinforcement resin material, researchers are therefore searching for a production process that makes it possible to maintain the high performance levels while significantly shortening the molding times of the materials. The possibility of attaining this object of the process depends quite obviously on the number and the nature of the constituent materials of these products, but primarily on the ability to find a resin that provides all of the properties listed above and is able particularly to harden (crosslink) during a molding process in a very short period of time.

SUMMARY OF THE INVENTION

An object of this invention is to meet the needs expressed above in the area of oriented-reinforcement prepregs and in the production of high-performance composite products.

An object of this invention is therefore a resin that can be used for the fabrication of a composite product and which is therefore able to preimpregnate an oriented-reinforcement material and to harden, preferably at a temperature of about 80° C. to 150° C. for a period of about 30 seconds to 6 minutes, in order to connect the oriented reinforcements and to ensure the adhesion of the oriented-reinforcement material to the other constituent materials of the composite product. To fulfill the condition of good wetting of the oriented reinforcement, the resin should preferably have a viscosity that does not exceed 10 dPa.sec at the temperature selected for impregnation. This resin is a modified polyester-polyurethane that is formed by reacting:

a first component that comprises (A) at least one polyisocyanate that has a functionality of 2 to 3, i.e., contains 2–3 NCO groups, and (B) a peroxide or a peroxide mixture that is able to initiate polymerization by free radicals at a ratio such that:

$$\frac{(B)}{(A)+(B)}$$

is about 0.5 to 4% by weight,
with a second component that comprises:
(a) at least one polyol polyester that is prepared from at least one diacid or ethylenically unsaturated anhydride and at least one polyhydric alcohol at an alcohol/acid molar ratio of between about 1.3 and 2.0,
(b) at least one ethylenically unsaturated monomer at a ratio such that $$\frac{(b)}{(a)+(b)}$$

is between 10% and 50% by weight,
(c) at least one promoter of the decomposition of the catalyst peroxide at room temperature (20° C.), at a level, with respect to the level of the second component, of about 0 to 4% by weight,
(d) at least one catalyst of the isocyanate-alcohol reaction, at the level based on the second component, of about 0 to 4% by weight, and
(e) at least one hydroxylated (alk)acrylate at a ratio such that $$\frac{(e)}{(a)+(e)}$$

is between about 0.1% and 35% by weight
with the ratio in moles of the NCO functions in the first component to the sum of the OH functions of components (a) and (e) of the second component being about 0.7 to 1.1.

The resin thus defined according to the invention most often exhibits a glass transition temperature of about 100° to 160° C.

The resin according to the invention is suitable to a process for the fabrication of a composite product that involves juxtaposing several materials of different natures, including an oriented-reinforcement material that is preimpregnated with resin, a stage for molding at high temperature for long enough that the resin that is hardened by the temperature elevation connects the oriented reinforcements and ensures the adhesion of the oriented-reinforcement material to other constituent materials of the composite product, and in which all the constituent materials, including the resin, are assembled simultaneously before the raising of temperature in the molding stage, i.e., without the resin being injected separately after the other materials are assembled in the mold. The molding is preferably carried out at a temperature of about 80° C. to 150° C., and more preferably 80° C. to 120° C. and/or for a period of about 30 seconds to 6 minutes. The other materials combined with the oriented-reinforcement material that is preimpregnated with resin in the composite product can be selected particularly from metals (e.g., steel, copper, aluminum, etc.), thermoplastic polymers (e.g., polyethylene, polypropylene, polyamides), and polyurethanes.

Optionally, the first component can comprise, in addition to polyisocyanate(s) (A) and peroxide(s) (B), at least one ethylenically unsaturated monomer that is identical to or different from the one that is present in the second component but preferably is miscible with the latter.

In the meaning of this invention, ethylenically unsaturated monomer (b) is defined as a monomer that is able to copolymerize, under certain conditions, with polyol polyester (a) to produce a crosslinked structure. This monomer can be selected from among styrene, substituted styrenes such as vinyl toluene, tert-butyl styrene, α-methylstyrene, chlorostyrene, dichlorostyrene, dibutyl fumarate and maleate, diethyl fumarate and maleate, dimethyl fumarate and maleate, N-vinylpyrrolidone, allyl methacrylate, allyl acetate, diallyl succinate, N-vinylcarbazole, lower alkyl esters ($C_1$ to $C_8$) of acrylic acid and methacrylic acid, cyclic acrylates and methacrylates, such as those of cyclohexyl and benzyl, bicyclic methacrylates and acrylates, such as those of isobornyl, diallyl phthalate, diallyl maleate, diallyl fumarate, triallyl cyanurate, acetate, vinyl crotonate and propionate, divinyl ether, conjugated dienes such as butadiene-1,3, isoprene, 1,3-pentadiene, 1,4-pentadiene, 1,4-hexadiene, 1,5-hexadiene, 1-9-decadiene, 5-methylene-2-norbornene, 5-vinyl-2-norbornene, 2-alkyl-2,5-norbornadienes, 5-ethylidine-2-norbornene, 5-(2-propenyl)-2-norbornene, 5-(5-hexenyl)-2-norbornene, 1,5-cyclooctadiene, bicyclo[2,2,2] octa-2,5-diene, cyclopentadiene, 4,7,8,9-tetrahydroindene and isopropylidene tetrahydroindene, and unsaturated nitriles such as acrylonitrile and methacrylonitrile as well as polyol (meth)acrylates such as the diacrylates and dimethacrylates of ethylene glycol, of propylene glycol, of 1,3-butanediol, of 1,4-butanediol, of 1,6-hexanediol, of neopentyl glycol, of 1,4-cyclohexanediol, of 1,4-cyclohexanedimethanol, of 2,2,4-trimethyl-1,3-pentanediol, of 2-ethyl-2-methyl-1,3-propanediol, of 2,2-diethyl-1,3-propanediol, of diethylene glycol, of dipropylene glycol, of triethylene glycol, of tripropylene glycol, of tetraethylene glycol, of tetrapropylene glycol, of trimethylolethane, of trimethylolpropane, of glycerol, of pentaerythritol; triacrylates and trimethacrylates of trimethylolethane, of trimethylolpropane, of glycerol and of pentaerythritol; pentaerythritol tetraacrylates and tetramethacrylates, dipentaerythritol di(meth)acrylates to hexa(meth)acrylates; monoethoxylated or polyethoxylated or monoproxylated or polyproxylated polyol poly(meth)acrylates such as the triacrylate and trimethacrylate of triethoxylated trimethylolpropane and tripropoxylated trimethylolpropane; tripropoxylated glycerol triacrylate and trimethacrylate; tetraethoxylated pentaerythritol triacrylate, trimethacrylate, tetraacrylate and tetramethacrylate, and their mixtures at all ratios.

Polyol polyesters (a) are well known and are prepared by reacting polycarboxylic acids or their anhydrides with polyhydrous alcohols. They are mainly linear and have a molecular weight of generally between about 400 and 4000. They can also have side chains when polyols or polycarboxylic acids that have more than two functional groups are used. It is generally preferred to prepare them from dicarboxylic acids with α,β-ethylenic unsaturation such as maleic, fumaric, citraconic, metaconic, itaconic, tetraconic or similar acids, or, when they exist, from corresponding anhydrides such as maleic anhydride.

It is also possible to prepare polyol polyesters (a) that are used in the resin according to the invention by partially replacing these α,β-ethylene-unsaturated dicarboxylic acids with (a) saturated polycarboxylic acid(s) such as the orthophthalic, isophthalic, terephthalic, succinic, methylsuccinic, adipic, sebacic, tetrabromophthalic, hexachloro-endomethylene tetrahydrophthalic, tetrachlorophthalic, glutaric, pimelic or similar acids, or, when they exist, the corresponding anhydrides. Preferably, the replacement can go up to about 45 mole %.

Among the polyhydrous alcohols that are used for the preparation of these polyol polyesters (a), generally saturated aliphatic diols, such as ethylene glycol, propylene glycol, butylene glycol, diethylene glycol, dipropylene glycol, triethylene glycol, tetraethylene glycol, butanediol, pentanediol, hexanediol, dibromoneopentyl glycol, 2-methyl-1,3 propanediol and neopentyl glycol are preferred. Bisphenol A and its alkoxylated derivatives, as well as other aromatic polyols, can also be used. To strike a satisfactory compromise between the reactivity of the system, the impact resistance of the resin, and its vitreous transition temperature, it is preferred to use a mixture of neopentyl glycol, propylene glycol and diethylene glycol.

The preparation of polyol polyester (a) can be carried out in the presence of an effective amount of at least one crosslinking inhibitor. As examples of crosslinking inhibitors that can be used, particularly phenothiazine, methylic ether of hydroquinone, N,N-diethyl-hydroxyamine, nitrobenzene, di-tert-butylcatechol, hydroquinone, p-anilinophenol, di-(2-ethylhexyl)-octylphenyl phosphite, 2,5-di-tert-butyl-4-hydroxy-toluene, methylene blue and their mixtures at all ratios can be cited. An effective amount of crosslinking inhibitor is generally between 0.01% and 0.2% by weight of polyol polyester (a).

Polyol polyesters (a) that can be used in this invention have an alcohol index of between about 100 and 300 mg of KOH required to neutralize the acetic acid consumed by the acetylation of 1 g of sample, i.e., acetylation of the OH groups by acetic anhydride in a ethyl acetate solution int he presence of para-tolyl sulfonic acid as a catalyst and an acid index that does not exceed about 10 and preferably does not exceed about 5 (milligrams of KOH required to neutralize 1 g of product). Their water content should not be more than 5000 ppm, preferably not more than about 2000 ppm, and still more particularly not more than 800 ppm.

Polyisocyanate (A) that is used in this invention has a functionality of at least 2 and at most 3. It can be aliphatic, cycloaliphatic and/or aromatic and selected from among, in particular, 4,4'-diphenylmethane diisocyanate, 2,4- and 2,6-toluenediisocyanate, isophorone diisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4, 4,4"-triisocyanate, polymethylene (polyphenyl isocyanate), m-phenylene diisocyanate, p-phenylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate and 3,3'-dimethyldiphenyl -methane-4,4'-diisocyanate. It can also be used in the form of a prepolymer of the polyurea type or polyurethane of low molecular weight, i.e., by causing one of the polyisocyanates listed below to react with a polyamine or a polyol of low molecular weight. In the latter case, it is preferred to use an alkylene glycol, such as dipropylene glycol, tripropylene glycol, diethylene glycol, triethylene glycol, tetraethylene glycol, neopentyl glycol, 1,2- and 1,3-butylene glycols and trimethylolpropane. In this invention, polyisocyanate (A) can also be used in uretonimine form by heating one of the polyisocyanates indicated below to a high temperature in the presence of a catalyst that contains phosphorus to form a polycarbodiimide and then by causing the latter to react with another isocyanate group, for example as described in U.S. Pat. No. 4,014,935.

Peroxide or peroxide mixture (B) is preferably an organic peroxide such as benzoyl peroxide, 2,5-dimethyl-2,5-bis(2-ethylhexolperoxy)hexane or methylethylcetone peroxide, a peroxydicarbonate, a peroxyester such as tert-butyl peroxybenzoate, tert-butyl peroxyoctoate, tert-amyl peroxyoctoate or 2,5-diperoxyoctoate, or else 2,4-pentanedione peroxide. The ratio of peroxide or peroxide mixture (B) is preferably such that $$\frac{(B)}{(A)+(B)}$$

is about 1 to 2% by weight

The peroxide that is preferred according to the invention is benzoyl peroxide used alone or else in a mixture with a minority ratio of tert-butyl peroxy-2-ethylhexanoate.

As promoter (c), which is preferably used at a ratio of between 0.3% and 1.5% by weight, particularly solutions in an organic solvent such as dioctyl phthalate, mineral salts or organic salts of transition metals such as vanadium, chromium, manganese, iron, cobalt, nickel, copper, zinc, molybdenum and lead, or else tertiary amines such as dimethylaniline or N,N-dimethyl paratoluidine can be cited.

When peroxide (B) is benzoyl peroxide, a tertiary amine is preferably used as a promoter. When peroxide (B) is methylethylcetone peroxide, a salt such as naphthenate or cobalt octoate is preferably used as a promoter.

As a reaction catalyst (d) of the isocyanate functions with the alcohol functions of polyol polyester (a), it is possible to cite:

tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2,2,2] octane and pyridine oxide, tertiary phosphines such as trialkylphosphines and dialkylbenzylphosphines, strong bases such as hydroxides, alcoholates and phenolates of alkaline and alkaline-earth metals, metallic salts of strong acids such as ferric chlorides, stannic chlorides, stannous chlorides and bismuth chlorides, antimony trichloride and bismuth nitrate, chelates such as those that can be obtained from acetylacetone, benzoylacetone, trifluoroacetylacetone, ethyl acetoacetate, salicylaldehyde, cyclopentanone-2-carboxylate, acetylacetoimine, bis-acetylacetonealkylene diimines, salicylaldehyde imine and starting from metals such as beryllium, magnesium, zinc, cadmium, lead, titanium, zirconium, tin, arsenic, bismuth, chromium, molybdenum, manganese, iron, cobalt and nickel, alcoholates and phenolates of metals such as $Ti(OR)_4$, $Sn(OR)_4$, $Sn(OR)_2$ and $Al(OR)_3$ in which R is an alkyl or aryl group, salts of organic acids and metals such as alkaline. metals and alkaline-earth metals, aluminum, tin, lead, manganese, cobalt, nickel and copper, for example, sodium acetate, potassium laurate, calcium hexanoate, stannous acetate, stannous octoate and stannous oleate, lead octoate, manganese and cobalt naphthenates, and carbonyl metals of iron and of cobalt and organometallic derivatives of tetravalent tin, of trivalent and pentavalent arsenic, of antimony and bismuth; among these derivatives more particular preference is given to dialkyltin salts of carboxylic acids such as dibutyltin diacetate, dibutyltin dilaurate, dibutyltin maleate, dilauryltin diacetate, dioctyltin diacetate, dibutyltin bis (4-methylaminobenzoate), dibutyltin (6-methylaminocaproate), trialkyltin hydroxides, dialkyltin oxides, dialkyltin dialkoxides and dialkyl tin dichlorides.

Catalyst (d) is preferably used at a ratio of 0 to 1.5% by weight of the second component.

To attain the objects of this invention, the expected characteristics of the modified polyester-polyurethane resin are obtained by bringing together the first component and the second component in proportions such that the molar ratio of the isocyanate functions to the hydroxyl functions of polyol polyester (a) and hydroxylated (alk)acrylate (e) is about 0.7 to 1.1, and preferably between 0.85 and 1.05. This rule corresponds most often to a ratio by weight of the second component to the first component of from about 1.5 to 3.0. An NCO/OH ratio that is higher, the higher the water content of polyol polyester (a) will be selected.

In the meaning of this invention, hydroxylated (alk)acrylate is defined as a compound of general formula:

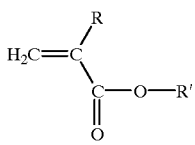

in which R is selected from among the hydrogen atom and the alkyl radicals that preferably have 1 to 4 carbon atoms, and R' is a radical that contains hydrocarbons, preferably an alkyl radical, carrying at least one hydroxyl function, preferably located at a chain end.

As examples of such compounds that can be used in this invention to form the reaction product that constitutes the polymer phase that can be hardened, it is possible to cite particularly hydroxyalkyl acrylates, hydroxyalkyl methacrylates and hydroxyalkyl ethylacrylates such as 2-hydroxyethyl and 2-hydroxypropyl acrylates and methacrylates, partial acrylic or methacrylic esters of di- or polyhydroxylated compounds such as the mono(meth)acrylate of ethylene glycol, of propylene glycol-1,2 or -1,3, of butylene glycol-1,4, of hexamethylene glycol-1,6, of diethylene glycol, of triethylene glycol, of dipropylene glycol, of glycerol, of trimethylolpropane, of pentaerythritol, etc.

Hydroxylated (alk)acrylate (e) is preferably present in the second component at a ratio such that $$\frac{(e)}{(a)+(e)}$$

is between about 5% and 20% by weight.

Generally, this ratio will be selected lower, the lower the functionality of polyisocyanate (A), i.e., closer to 2.

A second object of this invention consists of an oriented-reinforcement material that is preimpregnated with resin and is suitable for shaping, characterized in that the resin for impregnation is a modified polyester-polyurethane resin such as that described in detail as the first object of the invention. The oriented reinforcement of the preimpregnated material that can be shaped according to the invention can consist of any material that is already used conventionally in the technology of materials that are preimpregnated with synthetic resin, for example, mineral glass, carbon, or certain organic polymers such as polyamides. It can come in the form of fibers or wires with a length of at least about 25 mm, or of cloth or mat. When it consists of mineral glass, the oriented reinforcement preferably comes in the form of an assembly of a large number of minor filaments that are joined to form wires by an adhesive (often called a coupling agent), with these wires being grouped into bundles called "rovings." The ratio of oriented reinforcement in the preimpregnated material that can be shaped according to the invention is most often 30% to 85% by weight and preferably about 50% to 80% by weight. The preimpregnated oriented-reinforcement material according to the invention can advantageously be obtained by mixing the two components of the modified polyester-polyurethane resin at ratios such that the molar ratio of the NCO functions to the OH functions is about 0.7 to 1.1, whereby the mixing is carried out at a temperature of from about −5° C. to about 40° C. by pouring this mixture into an impregnation tank in which the oriented reinforcement is soaked long enough to allow it to be impregnated with the modified polyester-polyurethane resin. At the end of this time, the preimpregnated oriented-reinforcement material can be wound so that it can be stored in the form of coils. If necessary, the oriented reinforcement can, before it enters the impregnation bath, i.e., the impregnation tank that contains the resin, be coated with a protective film such as a paper film that contains silicone or plastic material on one of its faces and/or after it enters the impregnation bath, it can be coated with such a protective film on its other face. The soaking of the oriented reinforcement in the impregnation bath can be carried out either statically (discontinuous process) or, preferably, dynamically (continuous process) by making the oriented reinforcement advance at a rate of flow of about 10 m/min. to about 200 m/min. Thus, the average soaking time of the oriented reinforcement in the impregnation bath is preferably between about 1 and 30 seconds, when, as indicated above, the viscosity of the modified polyester-polyurethane resin does not exceed about 10 dPa.sec at the impregnation temperature, which is selected to be from about −5° C. to about 40° C. Because of the duration of the "pot life," or stability before use, of the modified polyester-polyurethane resin according to the invention, it is preferable that the soaking of the oriented reinforcement in said resin take place at most for 90 minutes, and preferably at most about 45 minutes after its two components are mixed. Beyond this period, actually, a change (increase) in the viscosity of the resin occurs, which makes it unsuitable for satisfactory wetting of the oriented reinforcement at the temperature in question.

After soaking in the bath and, if necessary, the application of a protective film of paper that contains silicone or plastic material on one of its faces, the preimpregnated material according to the invention is generally too sticky and not rigid enough to be handled easily. To overcome this difficulty, it is necessary that at least about 80 mole % of the isocyanate functions that are present in first component (A) of the resin have been converted by reaction with the hydroxide functions that are present in the second component of the resin. For this purpose, it is sufficient to allow the preimpregnated material according to the invention to be stored, before it is used in a molding process, for at least about 1 hour, and preferably for at least about 6 hours, at a temperature of about −5° C. to about 40° C., i.e., at a temperature which can be equal to the impregnation temperature. It is only in the case where the preimpregnated material needs to be handled more quickly that the conversion of the isocyanate functions can be accelerated by storing said material in an oven that is set to a temperature that is higher than room temperature, for example, on the order of 40° C. Storing the preimpregnated material according to the invention for longer than this has an adverse effect on neither its handling ability nor its mechanical properties. Thus, this preimpregnated material can be stored without any problems for a period of up to at least about 10 days before being used in a molding process.

Another object of this invention consists of a process for molding the preimpregnated oriented-reinforcement material that can be shaped and that is described above, whereby the molding is carried out at a temperature of about 80° C. to 150° C. for a period of about 30 seconds to 6 minutes. The duration of the molding process is generally shorter, the higher the molding temperature. The technique used is most often the process of molding by resin transfer, using a pressure of about 5 to 100 bars. The mold used can be made of metal or synthetic resin, depending on the temperature and the pressure of the molding selected. A demolding agent of a type known in the art can be applied to the mold, if necessary. The preimpregnated oriented-reinforcement material can be either molded by itself or within the framework of the production of a composite product with different constituent materials as in the process according to the invention. Because of its excellent adhesion to the materials that are as varied as metals (steel, copper, aluminum) and plastics (polyethylene, polypropylene, polyamides, polyurethanes), it is particularly well suited for the latter framework.

The examples below are provided as illustrative and nonlimiting examples of this invention.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding French application No. 95/01485, filed Feb. 7, 1995, are hereby incorporated by reference.

EXAMPLES

EXAMPLE 1

A first resin component is first produced by mixing 98 parts by weight of poly-4,4'-diphenylmethane diisocyanate of a functionality equal to 2.2 that is marketed by the DOW CHEMICAL company under reference M309 and 2 parts by weight of tert-butyl peroxy-2-ethylhexanoate that is marketed by the AKZO company under reference TRIGONOX 21S.

In addition, a second resin component is prepared, comprising:

57 parts by weight of a polyol polyester of an acid index equal to 5 and an alcohol index equal to 270, prepared from 1 mol of fumaric acid, 0.51 mol of propylene glycol, 0.51 mol of neopentyl glycol, and 0.68 mol of diethylene glycol, 30.7 parts by weight of styrene, and 12.3 parts by weight of hydroxyethyl methacrylate.

A preimpregnated material that can be shaped is then obtained by mixing the two resin components above at a temperature of 20° C., at ratios such that the molar ratio of the isocyanate functions that are present in the first component to the hydroxyl functions that are present in the second component is equal to 1.0 (i.e., with a ratio of weight R of the second component to the first component equal to 1.97), then by pouring this mixture in which a glass fiber cloth that is marketed by the FLEMINGS company under reference UD/UC-660, used at a ratio of 65 parts by weight of glass fiber to 35 parts by weight of resin, is soaked for 30 seconds at a temperature of 20° C. With the resin mixture, whose pot service life ("pot life") or stability before use is 75 minutes at 25° C., having a viscosity of 0.8 dPa.sec at the selected temperature (20° C.), it is observed that the impregnation of the glass cloth is carried out in a satisfactory manner. At the output of the bath, however, the preimpregnated material is not rigid enough and is too sticky to be handled easily. It is therefore necessary to store it for about 6 hours at 23° C. in order to be able to handle it. An analysis by infrared spectrometry shows that 80% of the isocyanate functions that are originally present have then been converted by reaction with the hydroxyl functions.

24 hours later, the preimpregnated oriented-reinforcement material thus obtained is molded in a metallic mold, in a press that is set to a temperature of 120° C., for 3 minutes and under a pressure of 100 bars. In the molded product thus obtained, the following properties are measured:

TG: Glass transition temperature determined by differential scanning calorimetry and expressed in degrees Celsius, MT: modulus in tension according to standard NFT 51034 and expressed in MPa, CT: tensile stress according to standard NFT 51034 and expressed in MPa.

The results for the tensile properties that are measured at 23° C. appear in Table I. The tensile properties that are measured at −40° C. are as follows: MT=22,500 MPa, CT=438 MPa.

EXAMPLE 2

The process steps of Example 1 are repeated, with the following exceptions:

the second component consists of 64.6 parts by weight of the same polyol polyester, 21.5 parts by. weight of styrene, and 13.9 parts by weight of hydroxyethyl methacrylate, ratio by weight R of the second component to the first component is equal to 1.93.

The resin obtained by mixing has a pot service life ("pot life") or stability before use at 25° C. of 55 minutes. It is used as in Example 1. The results for the properties measured in the molded product appear in Table I.

EXAMPLES 3 TO 5

The process steps of Example 1 are repeated by causing the functionality of poly-4,4'-diphenylmethane diisocyanate and the ratio of hydroxyethyl methacrylate to vary in the resin while keeping constant (equal to 35%) the ratio by weight of styrene relative to the sum of the polyol polyester and the styrene. The adjustment of the functionality is carried out by replacing reference product M309 respectively with:

the product of functionality 2.4 that is marketed by DOW CHEMICAL under reference M304 (Example 3), the product of functionality 2.1 that is marketed by the BAYER company under reference HV20 (Example 4), the product of functionality 2.0 that is marketed by DOW CHEMICAL under reference M342 (Example 5).

To take into account this change in the functionality, ratio by weight R of the second component to the first component of the resin is adjusted in the manner indicated in Table I. The results for the properties that are measured in the molded product as in Example 1 are listed in Table I.

EXAMPLES 6 to 8

The process steps of the preceding examples are repeated while setting the molar ratio of the isocyanate functions that are present in the first component to the hydroxyl functions that are present in the second component at 0.9 (instead of 1.0). To take this change into account, ratio by weight R of the second component to the first component of. the resin is adjusted in the manner indicated in Table I. The poly-4,4'-diphenylmethane diisocyanates used are:

for Example 6: reference HV20 of Example 4,
for Example 7: reference M309 of Example 1,
for example 8: reference M340 of functionality 2.1, marketed by DOW CHEMICAL.

The results for the properties that are measured in the molded product as in Example 1 are listed in Table I.

TABLE I

| Example | R | TG | MT | CT |
|---------|------|------|--------|-----|
| 1 | 1.97 | 147 | 27,500 | 555 |
| 2 | 1.93 | 103 | 27,500 | 454 |
| 3 | 1.78 | 122 | 28,500 | 598 |
| 4 | 1.56 | 135 | 23,000 | 453 |
| 5 | 1.56 | n.d. | 24,500 | 494 |
| 6 | 1.81 | 135 | 24,800 | 390 |
| 7 | 2.20 | 109 | 28,500 | 530 |
| 8 | 1.85 | 104 | 26,700 | 608 | n.d.: not determined

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A polyester-polyurethane resin produced by a process comprising reacting:

a first component that comprises (A) at least one polyisocyanate that has a functionality of 2 to 3 and (B) a peroxide or a peroxide mixture that is able to initiate polymerization by free radicals at a ratio such that:

$$\frac{(B)}{(A)+(B)}$$

is 0.5 to 4% by weight, with a second component that comprises:

(a) at least one polyol polyester that is prepared from at least one diacid or ethylenically unsaturated anhydride and at least one polyhydric alcohol, and has a hydroxyl group/acid group molar ratio of about 1.3:1 to 2.0:1, (b) at least one ethylenically unsaturated monomer at a ratio such that $$\frac{(b)}{(a)+(b)}$$

is from 10% to 50% by weight, (c) at least one promoter of the decomposition of the catalyst peroxide in the first component at room temperature (20° C.), in an amount of about 0 to 4% by weight with respect to the level of the second component, (d) at least one catalyst of the isocyanate-alcohol reaction, in an amount of from 0 to 4% by weight with respect to the level of the second component, and (e) at least one hydroxylated (alk)acrylate at a ratio such that $$\frac{(e)}{(a)+(e)}$$

is from about 0.1% to 35% by weight, the ratio in moles of the NCO functions in the first component to the sum of the OH functions of components (a) and (e) of the second component being about 0.7 to 1.1, and a weight ratio of the second component to the first component not more than 2.20, and wherein the ethylenically unsaturated monomer (b) is other than hydroxylated (alk)acrylate (e).

2. A polyester-polyurethane resin according to claim 1, having a glass transition temperature of about 100° to 160° C.

3. A resin acccording to claim 1, wherein the first component further comprises at least one additional ethylenically unsaturated monomer.

4. A resin according to claim 1, wherein the polyol polyester (a) is prepared from maleic, fumaric, citraconic, metaconic, itaconic or tetraconic acids, or a corresponding anhydride and ethylene glycol, propylene glycol, butylene glycol, diethylene glycol, dipropylene glycol, triethylene glycol, tetraethylene glycol, butanediol, pentanediol, hexanediol, dibromoneopentyl glycol, 2-methyl-1,3 propanediol, neopentyl glycol or bisphenol A.

5. A resin according to claim 1, wherein the diacid used to prepare the polyol polyester (a) is a mixture of α,β-ethylenically unsaturated dicarboxylic acids and up to about 45 mole % of the diacid of saturated polycarboxylic acids.

6. A resin according to claim 1, wherein polyisocyanate (A) is 4,4'-diphenylmethane diisocyanate, 2,4- or 2,6-toluenediisocyanate, isophorone diisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4,4',4"-triisocyanate, polymethylene (polyphenyl isocyanate), m-phenylene diisocyanate, p-phenylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate or 3,3'-dimethyldiphenylmethane-4,4'-diisocyanate.

7. A resin according to claim 1, wherein the peroxide or peroxide mixture (B) is benzoyl peroxide, 2,5-dimethyl-2,5-bis(2-ethylhexolperoxy)hexane or methethylketone peroxide, a peroxydicarbonate, tert-butyl peroxybenzoate, tert-butyl peroxyoctoate, tert-amyl peroxyoctoate, 2,5-diperoxyoctoate, or 2,4-pentanedione peroxide.

8. A resin according to claim 1, wherein the hydroxylated acrylate (e) has the formula

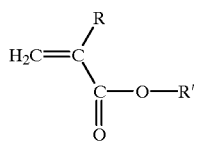

in which R is hydrogen or alkyl, and R' is a hydrocarbon radical having at least one hydroxyl group.

9. A resin according to claim 1, wherein ethylenically unsaturated monomer (b) is styrene, vinyl toluene, tert-butyl styrene, α-methylstyrene, chlorostyrene, dichlorostyrene, dibutyl fumarate or maleate, diethyl fumarate or maleate, dimethyl fumarate and maleate, N-vinylpyrrolidone, allyl methacrylate, allyl acetate, diallyl succinate, N-vinylcarbazole, $C_{1-8}$-alkyl esters of acrylic acid or methacrylic acid, cyclohexyl (meth)acrylate, benzyl (meth) acrylate, isobornyl phthalate, diallyl phthalate, diallyl maleate, diallyl fumarate, triallyl cyanurate, triallyl acetate, vinyl crotonate, vinyl propionate, divinyl ether, 1,3-butadiene, isoprene, 1,3-pentadiene, 1,4-pentadiene, 1,4-hexadiene, 1,5-hexadiene, 1-9-decadiene, 5-methylene-2-norbornene, 5-vinyl-2-norbornene, 2-alkyl-2,5-norbornadienes, 5-ethylidine-2-norbornene, 5-(2-propenyl)-2-norbornene, 5-(5-hexenyl)-2-norbornene, 1,5-cyclooctadiene, bicyclo[2,2,2]octa-2,5-diene, cyclopentadiene, 4,7,8,9-tetrahydroindene or isopropylidene tetrahydroindene, acrylonitrile, methacrylonitrile, a diacrylate or dimethacrylate of ethylene glycol, propylene glycol, 1,3-butanediol, 1,4-butanediol, 1,6-hexanediol, neopentyl glycol, 1,4-cyclohexanediol, 1,4-cyclohexanedimethanol, 2,2,4-trimethyl-1,3-pentanediol, 2-ethyl-2-methyl-1,3-propanediol, 2,2-diethyl-1,3-propanediol, diethylene glycol, dipropylene glycol, triethylene glycol, tripropylene glycol, tetraethylene glycol, tetrapropylene glycol; a triacrylate or trimethacrylate of trimethylolethane, trimethylolpropane, glycerol; a pentaerythritol tetraacrylate or tetramethacrylate, a dipentaerythritol hexa(meth)acrylate, a triacrylate or trimethacrylate of triethoxylated trimethylolpropane or tripropoxylated trimethylolpropane; tripropoxylated glycerol triacrylate or trimethacrylate; tetraethoxylated pentaerythritol tetraacrylate or tetramethacrylate, or a mixture thereof.

10. An oriented-reinforcement material that is preimpregnated with resin and is suitable for shaping, wherein the resin is a polyester-polyurethane resin according to claim 1.

11. A resin-preimpregnated oriented-reinforcement material according to claim 10, comprising 30% to 85% by weight of oriented reinforcement per total material.

12. A process for producing an oriented-reinforcement material that is preimpregnated with resin according to claim 10, comprising mixing the two components of the resin at ratios such that the molar ratio of the NCO functions to the OH functions is about 0.7 to 1.1, whereby the mixing is carried out at a temperature of from about −5° C. to about 40° C., and soaking the oriented reinforcement in the mixture for a period between 1 and 30 seconds.

13. A process according to claim 12, wherein the soaking of the oriented reinforcement in the resin takes place at most 90 minutes after the two components of the resin are mixed.

14. A material produced by the process of claim 12, wherein the resin has a viscosity of not more than 10 dPa.sec at a temperature at which the oriented-reinforcement material is impregnated with said resin.

* * * * *